Nov. 28, 1961  E. J. LEPREAU  3,010,460
APPARATUS FOR WETTING ABSORBENT BODIES FOR
MOISTENING AND SUPPORTING PLANT PARTS
Filed July 3, 1958  2 Sheets-Sheet 2

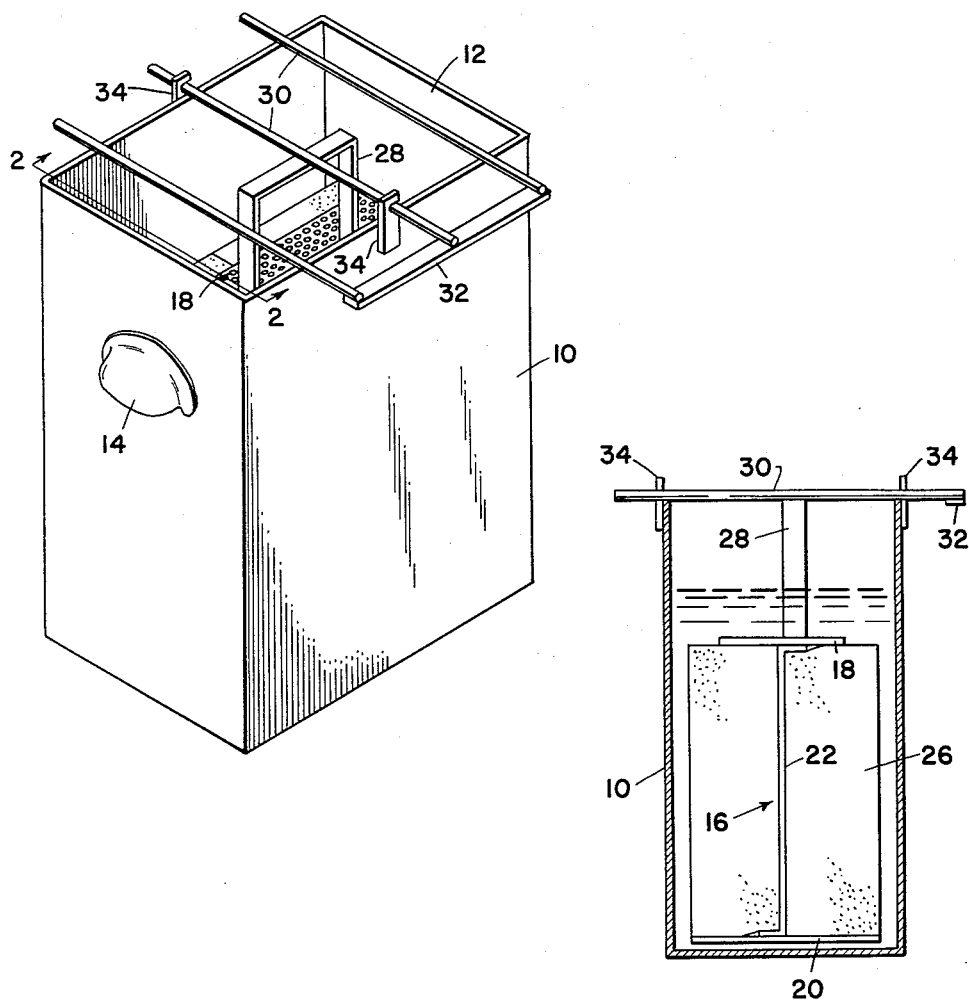

INVENTOR,
EUGENE J. LEPREAU
BY
Cumpston & Shaw
his attorneys.

3,010,460
APPARATUS FOR WETTING ABSORBENT BODIES FOR MOISTENING AND SUPPORTING PLANT PARTS

Eugene J. Lepreau, Sodus, N.Y., assignor to Geo. B. Hart Inc., Rochester, N.Y., a corporation of New York
Filed July 3, 1958, Ser. No. 746,532
5 Claims. (Cl. 134—135)

This invention provides an apparatus for wetting bodies or blocks of absorbent material, such as open-cell material having a plastic or like base, for use in moistening and supporting floral and other plant components as displayed, for example, in wedding and funeral decorations and the like. It has been a practice to employ blocks of material, such as that known and available commercially as "Oasis," into which the stems of plant components may be inserted to support and maintain the same in moistened condition. The wetting of such material to approximate saturation requires submergence of the material in water or other fluid for a period of, say, 30 minutes, after which the material is removed from the fluid and allowed to drain for another period of time until the excess fluid has drained away. This has proven, with the apparatus heretofore available, to be a tedious process, particularly where the conditioning of a number of such bodies is required. One object of the invention, therefore, is to provide improved apparatus for wetting and draining such bodies in a more convenient and expeditious manner.

Another object is the provision of such apparatus in which a plurality of such bodies may be simultaneously and conveniently prepared for use.

Still a further object is to provide an apparatus having the above advantages in a simple, practical and inexpensive form of construction.

To these and other ends the invention resides in certain improvements and combinations of parts, all as will be hereinafter more fully described, the novel features being pointed out in the claims at the end of the specification.

In the drawings:

FIG. 1 is a perspective view of an apparatus embodying the present invention as employed for holding the absorbent bodies submerged in the liquid contents of a container;

FIG. 2 is a sectional view on the line 2—2 in FIG. 1; and

Figure 3:
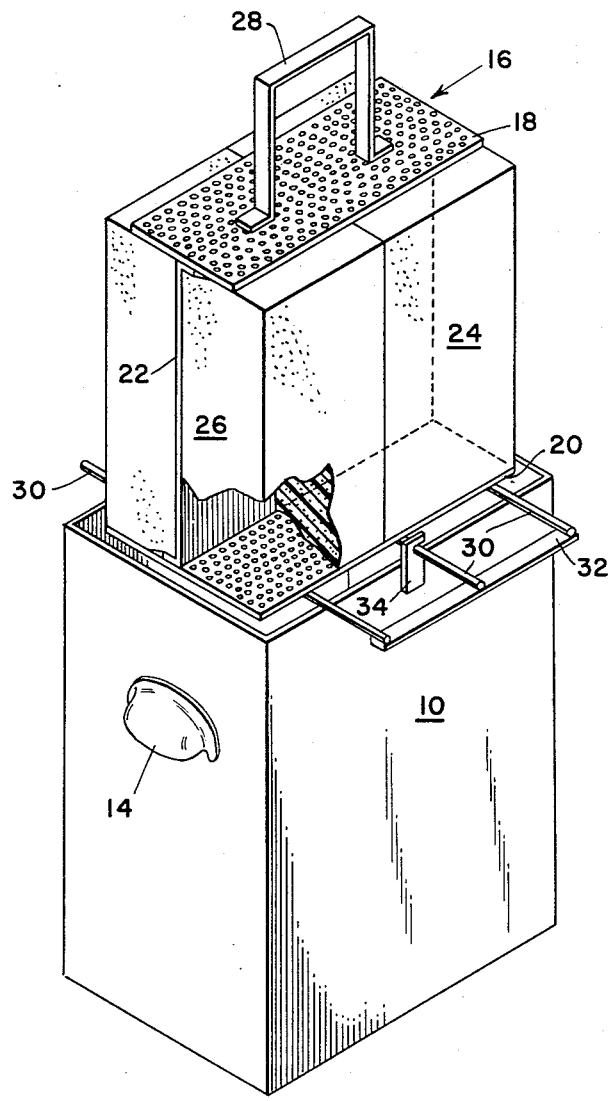
FIG. 3 is a perspective view similar to FIG. 1 but showing the apparatus as employed for holding the absorbent bodies supported in position for draining excess fluid back into the container.

The embodiment of the invention, herein disclosed by way of illustration, preferably comprises a substantially rectangular liquid container 10 having an open top 12 and provided with carrying handles 14. The means for receiving and holding the absorbent bodies comprises a frame, indicated generally at 16, having a pair of vertically spaced, plate-like, rectangular members 18 and 20 connected in superposed relation by a partition or plate 22 disposed centrally of the members 18 and 20, as shown, to provide compartments between the members on each side of the partition for the reception in each compartment of a pair of rectilinear blocks 24 and 26 of the absorbent material. The plate-like members 18 and 20 are preferably made foraminate by a multiplicity of relatively small holes, as shown, to provide quick access of water to and from the absorbent bodies. A handle 28 is fixed to the upper plate 18 for convenience in manipulating the frame member 16 into and out of the container.

The open-cell absorbent block of "Oasis" material is known to absorb approximately forty times its weight of water and requires a period of, say, 30 minutes, to absorb its capacity thereof. When then removed from the water, its excess of fluid is drained away, after which it is in condition for the insertion into it of the stems of plant parts so as to support the same in desired arrangements and maintain them in moistened and fresh condition. When first immersed, however, the absorbent blocks contain air and tend to float in water. By placing them in the compartments of frame member 16, as described above, a number of them may be submerged in the liquid which obtains ready access to them through the perforated members 18 and 20.

Means are provided for holding the frame with its buoyant bodies submerged, preferably comprising a foraminate means, such as a plurality of rods 30, connected together in parallel spaced relation, as shown, as by connecting bars 32 adjacent their ends. Such rods are removably held down on the open top of the container as by means of lugs 34 fixed to and projecting above opposite sides of the container, as shown, the lugs having their upper ends formed with holes opening at one side to provide hooks to receive and removably retain the central rod 30, thus retaining the frame 16 with its blocks immersed in the liquid to absorb the same.

When the blocks, as 24 and 26, have become substantially saturated, the rod means is detached from the lugs 34, and removed from the top of the container and frame 16 is elevated above the top of the container to allow the rod means to be replaced thereon, after which the frame with its blocks is supported on the rod means so that the excess fluid drains into the top of the container. When sufficiently drained, the moist blocks are readily removed from the frame for their intended uses.

While the frame member 16 has been described as comprising foraminate plates 18 and 20, it will be obvious that these parts may have other foraminate form, as may also the supporting means formed by rods 30. While the frame member 16 has been shown, for example, as holding four absorbent blocks, it is contemplated that its size may be varied as desired for increased capacity.

The invention thus provides a device of comparatively few parts of simple and rugged construction capable of being readily and economically manufactured and it supplies a convenient, practical and effective apparatus by means of which a number of absorbent bodies may be conditioned for use in a minimum of time and with a minimum of effort.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. In an apparatus for wetting and conditioning an absorbent body for moistening and supporting floral and other plant components, the combination with a fluid container having an open top, of a frame for insertion in said container to hold and immerse said body in fluid in said container and thereafter drain excess fluid therefrom back into said container, said frame comprising vertically spaced supporting members, means connecting said members and holding the same in relatively fixed substantially parallel relation to each other to form a compartment therebetween for engaging said body from above and below to hold the same against movement in said frame for exposure to said fluid, handle means on said frame for lifting the same, and foraminate means adapted to be removably fastened to and across the top of said container in position to first engage and hold said frame submerged during absorption of said fluid by said body and thereafter hold said frame on top of said container while draining excess fluid from said body into said container.

2. In an apparatus for wetting and conditioning absorbent bodies for moistening and supporting floral and other plant components, the combination with a fluid container having an open top, of a frame for insertion in said container to hold and immerse said bodies in fluid in said container and drain excess fluid therefrom back into said container, said frame comprising spaced, supporting members, a partition connecting said members in superposed, substantially parallel relation to form a plurality of compartments therebetween to hold said bodies for exposure to said fluid, handle means on said frame for inserting said frame in and removing it from said container, and foraminate means adapted to be removably positioned across the top of said container in engagement with a part on said frame to hold said frame and bodies submerged during absorption of fluid by said bodies.

3. In an apparatus for wetting and conditioning absorbent bodies for moistening and supporting floral and other plant components, the combination with a fluid container having an open top, of a frame for insertion in said container to hold and immerse said bodies in fluid in said container and drain excess fluid therefrom back into said container, said frame comprising spaced, foraminate plate members, a partition connecting said members in superposed, substantially parallel relation to form a plurality of compartments therebetween to hold said bodies for exposure to said fluid, handle means on said frame for inserting said frame in and removing it from said container, and foraminate means adapted to be removably positioned across the top of said container in engagement with a part on said frame to hold said frame and bodies submerged during absorption of fluid by said bodies and to thereafter hold said frame and bodies above said fluid while draining excess fluid from said bodies into said container.

4. In an apparatus for wetting and conditioning absorbent bodies for moistening and supporting floral and other plant components and the like, the combination with a fluid container having an open top, of a frame for insertion in said container to hold and immerse said bodies in fluid in said container and drain excess fluid therefrom back into said container, said frame comprising spaced, foraminate, supporting members, a partition for connecting and supporting said members in superposed, substantially parallel relation to form a plurality of compartments therebetween to hold said bodies for exposure to said fluid, and a plurality of rods connected together in spaced, coplanar relation and adapted to be removably secured across the top of said container in engagement with a part on said frame to hold said frame and bodies submerged during absorption of fluid by said bodies and to thereafter hold said frame and bodies above said fluid while draining excess fluid from said bodies into said container.

5. In an apparatus for wetting and conditioning absorbent bodies for moistening and supporting floral and other plant components, the combination with a substantially rectangular fluid container having an open top, of a frame for insertion in said container to hold and immerse said bodies in fluid in said container and drain excess fluid therefrom back into said container, said frame comprising a pair of spaced, foraminate plates, a partition for connecting and supporting said plates in superposed, substantially parallel relation to form a plurality of compartments therebetween to removably receive said bodies for exposure to said fluid, handle means on said frame for inserting said frame in and removing it from said container, said handle means having the top thereof co-planar with said container top, a plurality of rods connected together in spaced, coplanar relation and adapted to be removably positioned on top of said container in engagement with the top of said handle means, and means at the top of said container for releasably holding said rods thereon and holding said frame and bodies submerged during absorption of said fluid by said bodies, said rods being adapted to be positioned on top of said container to hold said frame and bodies above said fluid while draining excess fluid from said bodies into said container.

References Cited in the file of this patent

UNITED STATES PATENTS

| 536,889 | Nolen | Apr. 2, 1895 |
| 554,135 | Mullins | Feb. 4, 1896 |
| 779,641 | Crosby | Jan. 10, 1905 |
| 1,183,493 | Randolph | May 16, 1916 |
| 1,691,839 | Caskin | Nov. 13, 1928 |
| 2,249,142 | Kagel | July 15, 1941 |
| 2,302,698 | Kessel | Nov. 24, 1942 |
| 2,544,424 | Helliwell | Mar. 6, 1951 |
| 2,721,567 | Tierney | Oct. 25, 1955 |
| 2,820,446 | Freeman | Jan. 21, 1958 |

FOREIGN PATENTS

| 14,406 | Great Britain | of 1910 |